United States Patent
Sip et al.

(10) Patent No.: US 8,057,277 B2
(45) Date of Patent: Nov. 15, 2011

(54) TOY CAR WHEEL WITH ADJUSTABLE CENTER OF GRAVITY

(75) Inventors: Kim-Yeung Sip, Shenzhen (CN); Kui-Jun Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 146 days.

(21) Appl. No.: 12/547,494

(22) Filed: Aug. 26, 2009

(65) Prior Publication Data

US 2011/0014849 A1  Jan. 20, 2011

(30) Foreign Application Priority Data

Jul. 17, 2009  (CN) .......................... 2009 1 0304471

(51) Int. Cl.
*A63H 17/00* (2006.01)

(52) U.S. Cl. ....................................... 446/465; 446/431

(58) Field of Classification Search .................. 446/168, 446/431, 457, 465; 301/5.1, 53.5
See application file for complete search history.

(56) References Cited

U.S. PATENT DOCUMENTS

| 1,512,107 | A | * | 10/1924 | Koch | 446/412 |
| 1,637,479 | A | * | 8/1927 | Evelyn | 446/439 |
| 3,092,069 | A | * | 6/1963 | Baird | 116/60 |
| 3,716,093 | A | * | 2/1973 | Tsuchiya | 152/450 |
| 3,885,814 | A | * | 5/1975 | Rizzo | 280/217 |
| 4,151,676 | A | * | 5/1979 | Clark | 446/325 |
| 4,906,050 | A | * | 3/1990 | Soder et al. | 301/37.41 |
| 6,866,344 | B2 | * | 3/2005 | Oh | 301/5.301 |

FOREIGN PATENT DOCUMENTS

JP          59187134 A   * 10/1984

* cited by examiner

*Primary Examiner* — Gene Kim
*Assistant Examiner* — Alyssa Hylinski
(74) *Attorney, Agent, or Firm* — Altis Law Group, Inc.

(57) ABSTRACT

The present invention provides a toy car wheel with an adjustable center of gravity. The middle of the toy car wheel defines a through hole. At least one spoke is distributed between the rim of the toy car wheel and the through hole. At least one channel is defined in each spoke. At least one spherical body is disposed in each channel. When a toy car decelerates, a momentum of the toy car decreases, the at least one spherical body descends in a corresponding channel, and the center of gravity of the toy car wheel descends.

6 Claims, 4 Drawing Sheets

TOY CAR WHEEL WITH ADJUSTABLE CENTER OF GRAVITY

BACKGROUND

1. Technical Field

The disclosure relates to wheels and, more particularly, to a toy car wheel with an adjustable center of gravity.

2. Description of the Related Art

When a toy car moves on an irregular terrain, the toy car often decelerates. When the toy car decelerates, a center of gravity of the toy car does not change, thus causing the toy car to roll over easily.

BRIEF DESCRIPTION OF THE DRAWINGS

The components in the drawings are not necessarily drawn to scale, the emphasis in stead being placed upon clearly illustrating the principles of the toy car wheel. Moreover, in the drawings, like reference numerals designate corresponding parts throughout the several views.

DETAILED DESCRIPTION

Figure 1:
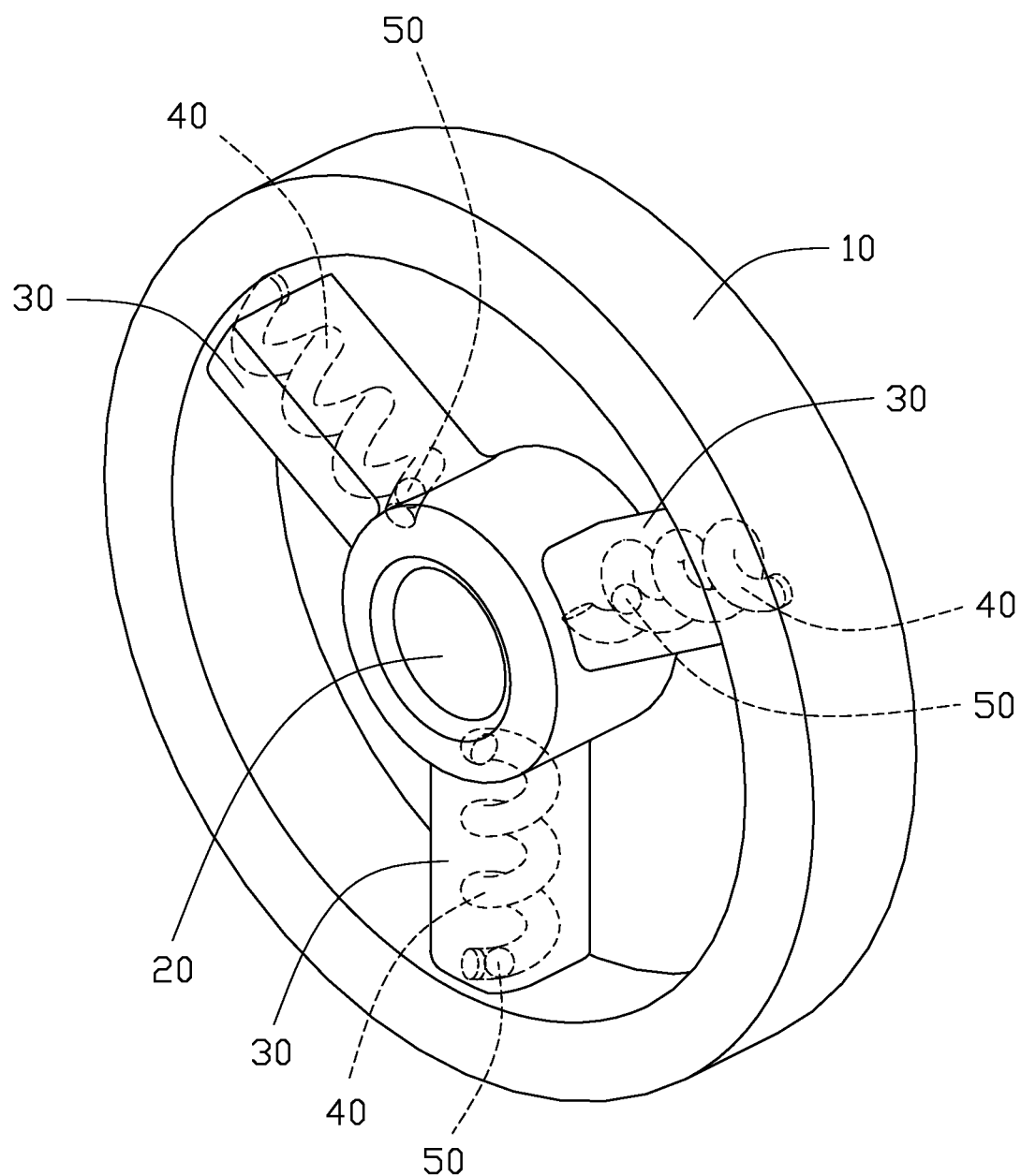
FIG. 1 is an isometric view of a toy car wheel in accordance with an embodiment.

FIG. 1 is an isometric view of a toy car wheel in accordance with an embodiment. A toy car wheel (hereinafter "wheel") 10 of a toy car is circular. The middle of the wheel 10 defines a through hole 20. At least one spoke 30 is distributed between the rim of the wheel 10 and the through hole 20. In this embodiment, the number of the at least one spoke 30 is three.

At least one channel 40 is defined in each spoke 30. Each channel 40 has a spiral shape. In this embodiment, the number of the at least one channel 40 in each spoke 30 is one. At least one spherical body 50 is disposed in each channel 40. When the toy car moves, each spherical body 50 moves in a corresponding channel 40. In this embodiment, the number of the at least one spherical body 50 in each channel 40 is one. One end of each channel 40 adjacent the rim of the wheel 10 is enveloped. Therefore, when the toy car moves at a high speed, each spiral channel 40 prevents each spherical body 50 from colliding with the rim of the wheel 10.

Figure 2:
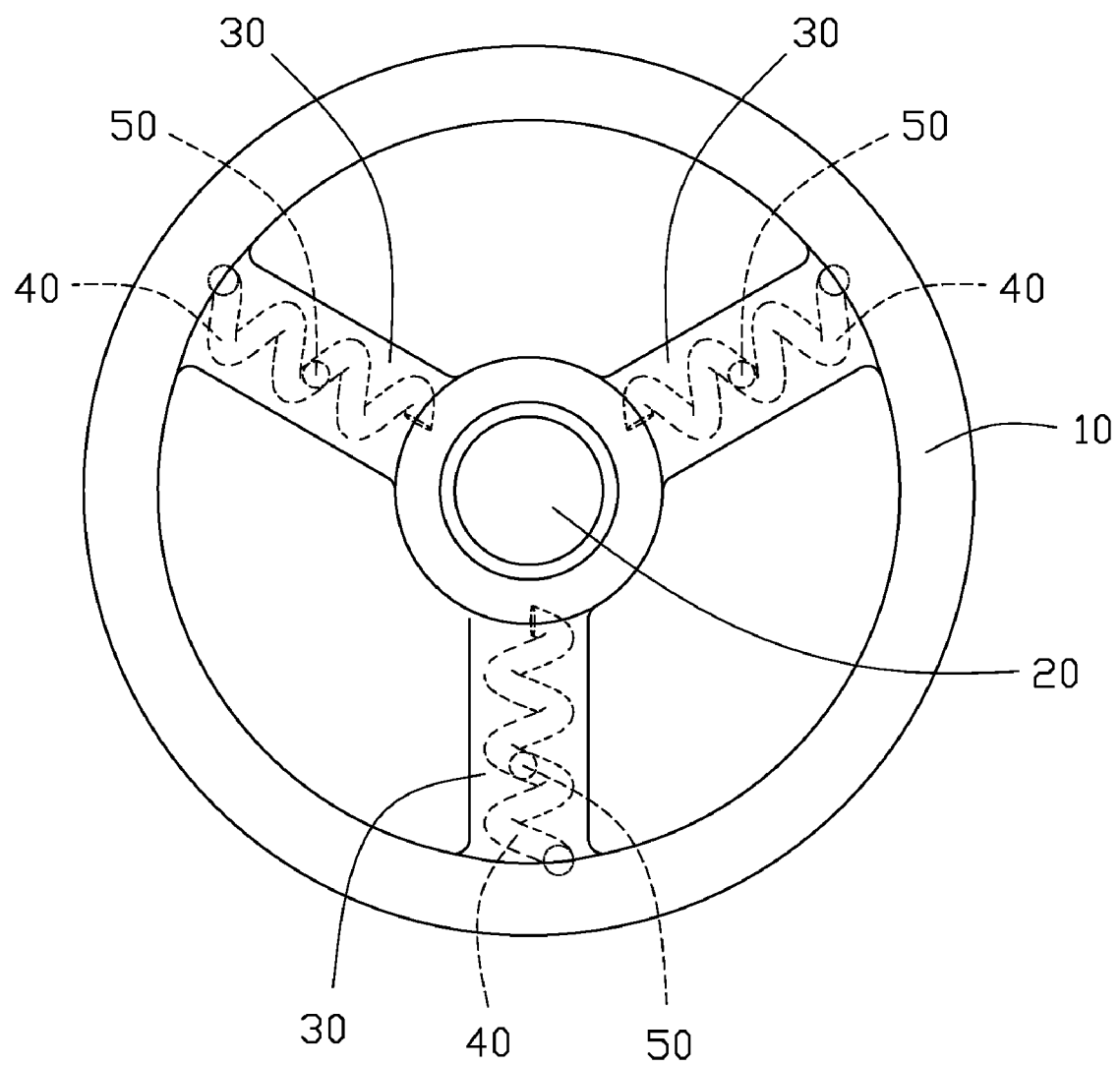
FIG. 2 is a first distribution schematic view of spherical bodies of the toy car wheel of FIG. 1.
Figure 3:
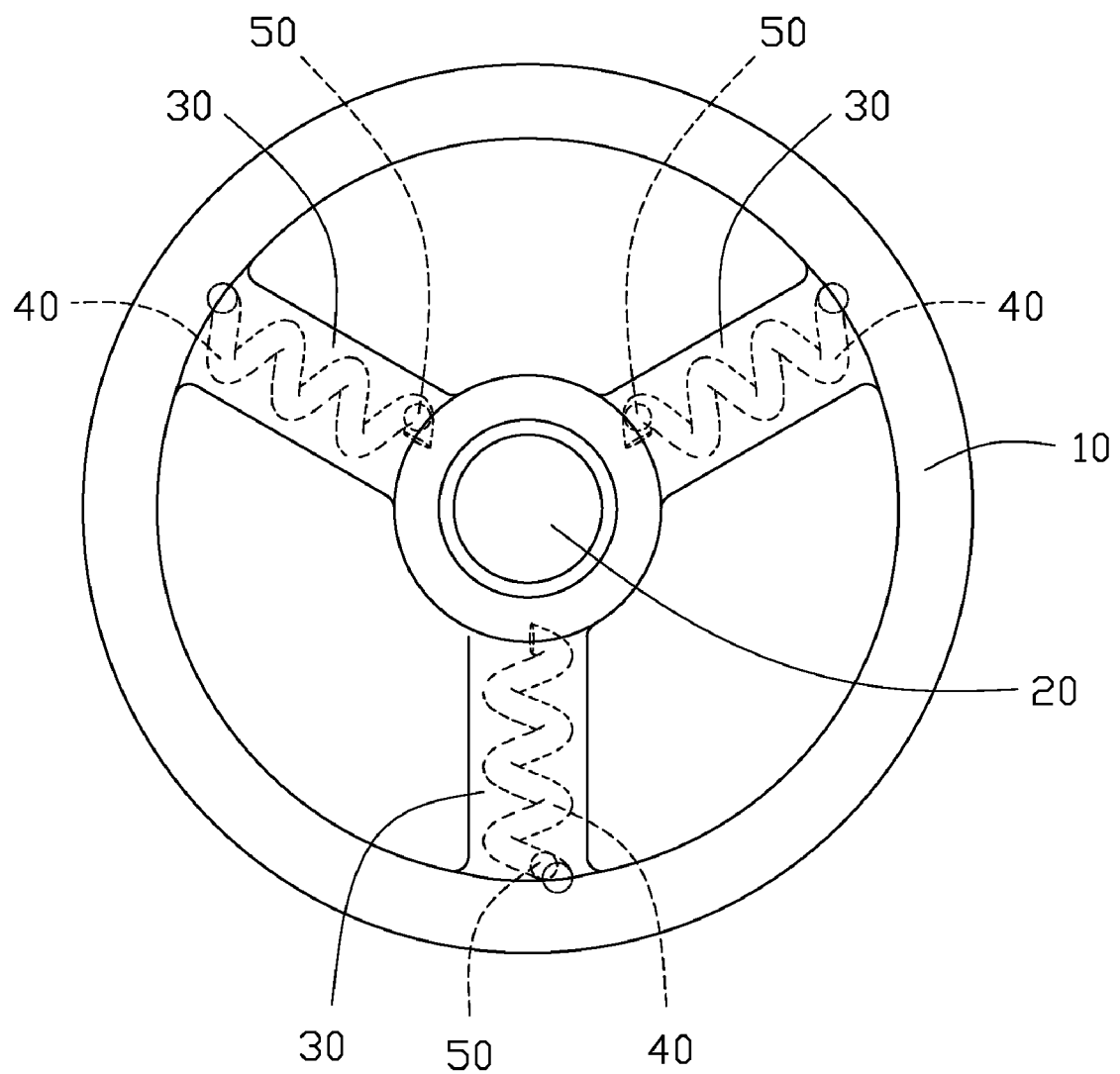
FIG. 3 is a second distribution schematic view of spherical bodies of the toy car wheel of FIG. 1.

As shown in FIG. 2, when the toy car moves at a normal speed, each spherical body 50 moves to the middle portion of the corresponding spiral channel 40 due to a momentum of the toy car and a weight of each spherical body 50. When the toy car decelerates, as shown in FIG. 3, the momentum of the toy car decreases and each spherical body 50 is free to move to a corresponding end of the 40 according to the position of the corresponding channel 40.

Figure 4:
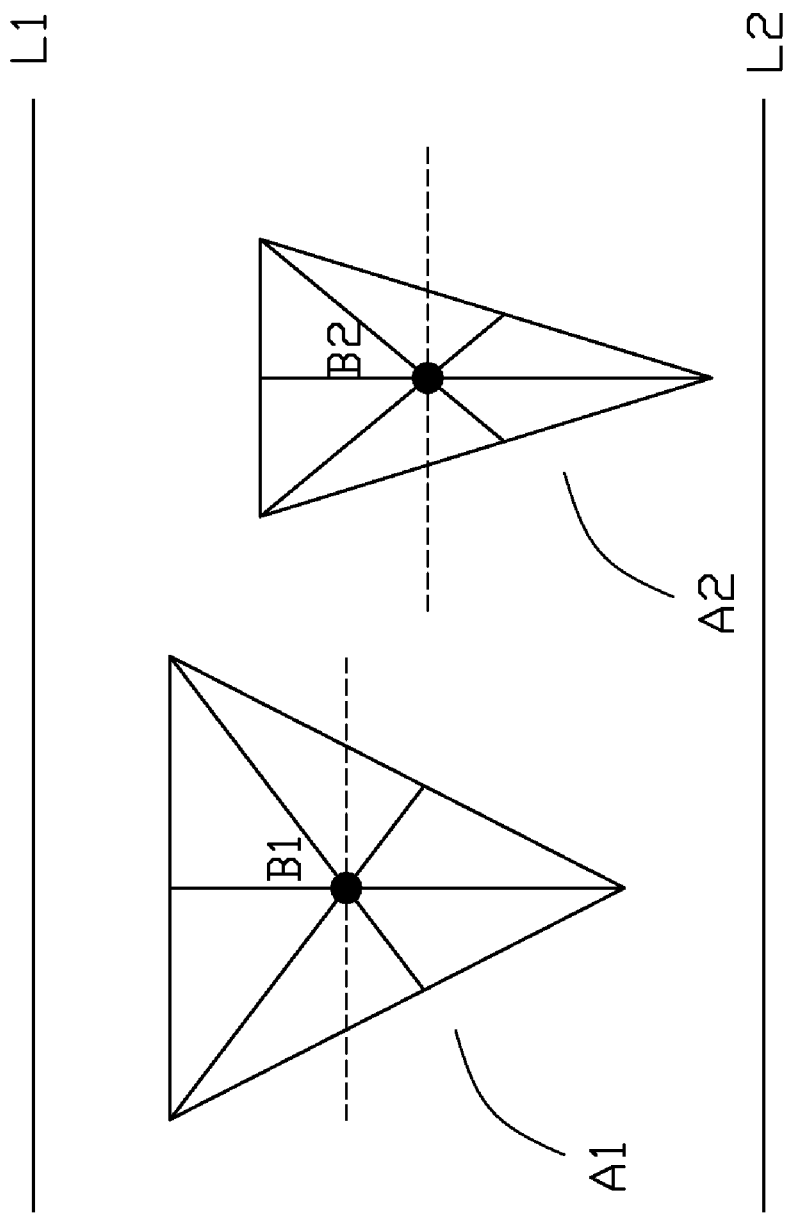
FIG. 4 is an explanatory view of a center of gravity of spherical bodies.

FIG. 4 is an explanatory view of a center of gravity of spherical bodies. A triangle is composed of three points which are defined three centers of gravity of three spherical bodies 50 in the corresponding channels 40, such as A1 and A2 according to two reference planes L1 and L2. The triangle A1 defines a distribution of three centers of gravity of three spherical bodies 50 when the toy car moves at the normal speed in FIG. 2. The triangle A2 defines a distribution of three centers of gravity of three spherical bodies 50 when the toy car decelerates in FIG. 3.

The center of gravity of the triangle A1 is placed at B1 point. The center of gravity of the triangle A2 is placed at B2 point. The B2 point is lower than the B1 point according to the reference plane L2. Therefore, when the toy car decelerates, the momentum of the toy car decreases, the center of gravity of three spherical bodies 50 moves downwards from the B1 point to the B2 point, and the center of gravity of the wheel 10 descends.

It is understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A toy car wheel with an adjustable center of gravity, comprising:
    at least one spoke;
    at least one spiral channel defined in each of the at least one spoke; and
    at least one spherical body disposed in each of the at least one spiral channel;
    wherein when the toy car moves at a normal speed, the at least one spherical body moves to a middle portion of a corresponding one of the at least one spiral channel in one of the at least one spoke, when the toy car decelerates, a momentum of the toy car decreases, the at least one spherical body descends in the corresponding spiral channel and the at least one spherical body moves to one end of the corresponding spiral channel, a center of gravity of the at least one spherical body moves downwards and the center of gravity of the toy car wheel descends.

2. The toy car wheel as recited in claim 1, wherein one end of each spiral channel is enveloped to prevent the at least one spherical body from colliding with a rim of the wheel.

3. The toy car wheel as recited in claim 1, wherein the number of the at least one spoke is three.

4. The toy car wheel as recited in claim 1, wherein the number of the at least one channel in a corresponding spoke is one.

5. The toy car wheel as recited in claim 1, wherein the number of the at least one spherical body in a corresponding channel is one.

6. The toy car wheel as recited in claim 1, further comprising a through hole defined in a middle of the wheel, wherein the at least one spoke is distributed between a rim of the wheel and the through hole.

* * * * *